(12) United States Patent
Lee et al.

(10) Patent No.: US 9,148,863 B2
(45) Date of Patent: Sep. 29, 2015

(54) MOBILE COMMUNICATION DEVICES, SERVICE NETWORKS, AND METHODS FOR MANAGING OPERATION OF A REGISTRATION PROCEDURE FOR MACHINE-TO-MACHINE (M2M) COMMUNICATIONS

(71) Applicant: VIA Telecom, Inc., San Diego, CA (US)

(72) Inventors: Anthony Lee, San Diego, CA (US); Guotong Wang, Beijing (CN)

(73) Assignee: VIA TELECOM CO., LTD., George Town, Grand Cayman (KY)

( * ) Notice: Subject to any disclaimer, the term of this patent is extended or adjusted under 35 U.S.C. 154(b) by 127 days.

(21) Appl. No.: 13/849,075

(22) Filed: Mar. 22, 2013

(65) Prior Publication Data

US 2013/0265990 A1    Oct. 10, 2013

Related U.S. Application Data

(60) Provisional application No. 61/621,233, filed on Apr. 6, 2012.

(51) Int. Cl.
*H04W 4/00* (2009.01)
*H04W 60/00* (2009.01)
*H04W 60/02* (2009.01)

(52) U.S. Cl.
CPC .............. *H04W 60/00* (2013.01); *H04W 60/02* (2013.01)

(58) Field of Classification Search
None
See application file for complete search history.

(56) References Cited

U.S. PATENT DOCUMENTS

2012/0058764 A1\*   3/2012   Kang et al. ................. 455/435.1
2013/0203344 A1\*   8/2013   Patwardhan et al. ......... 455/561

OTHER PUBLICATIONS

Ericsson, ST-Ericsson: "Conclusion on periodic update timers"; 3GPP TSG SA WG2 Meeting #79 electronic TD S2-103134 Jul. 6-10, 2010, Elbonia; pp. 1-3.

\* cited by examiner

*Primary Examiner* — Anh-Vu Ly
(74) *Attorney, Agent, or Firm* — McClure, Qualey & Rodack, LLP

(57) ABSTRACT

A mobile communication device configured for Machine-to-Machine (M2M) communications is provided. In the mobile communication device, a wireless module performs wireless transmissions and receptions to and from a service network, and a controller module receives a message with an extension registration period only for the M2M communications from the service network via the wireless module and periodically performs a registration procedure according to the extension registration period only for the M2M communications.

6 Claims, 5 Drawing Sheets

MOBILE COMMUNICATION DEVICES, SERVICE NETWORKS, AND METHODS FOR MANAGING OPERATION OF A REGISTRATION PROCEDURE FOR MACHINE-TO-MACHINE (M2M) COMMUNICATIONS

CROSS REFERENCE TO RELATED APPLICATIONS

This Application also claims priority of U.S. Provisional Application No. 61/621,233, filed on Apr. 6, 2012, and the entirety of which is incorporated by reference herein.

BACKGROUND OF THE INVENTION

1. Field of the Invention

The invention generally relates to the operation management of registration procedures, and more particularly, to operation management of registration procedures using extension registration periods for M2M communications.

2. Description of the Related Art

For a long time, various machines have been provided to make our lives more convenient in every way. Generally, machines, nowadays, are equipped with computing processors and software to accommodate us with more intelligence-based services. With the advancement of wireless communications, Machine-to-Machine (M2M) technology has been developed to enable communications between remote machines for exchanging information and operating without human interaction. Especially for critical public infrastructures, such as water treatment facilities and bridges, M2M sensors may be employed to monitor the operation statuses of facilities and report measurement results back to control centers via wireless communication networks, such as a Global System for Mobile Communication/General Packet Radio Service (GSM/GPRS), Universal Mobile Telecommunication System (UMTS), Code Division Multiple Access 2000 1x (CDMA2000 1x) system, 1x High Rate Packet Data (1xHRPD) system, and Long Term Evolution (LTE) system, etc. This allows administrators of the critical public infrastructures to know if certain components have been tampered with. Other applications may be earthquake monitoring, electric metering, gas/oil pipeline monitoring, or coke machine maintenance for reporting operation statuses to a centralized system via wireless communication networks, such that related services with higher efficiency and lower maintenance costs may be provided.

In a typical mobile communication environment using the CDMA2000 1x Evolution-Data Optimized (EV-DO) Revision F (or called 1xEV-DO Rev F) technology, a timer-based registration procedure is employed to cause the MS's, including M2M devices and general-purpose MS's (i.e., the MS's not configured for M2M communications), to periodically perform registration procedures for reporting information concerning their positions to the network side according to registration timers. Particularly, the registration timers are set to relatively small values, so that the changes of the MS's positions may be timely reported to the network side. However, the design of the timer-based registration procedure may result in necessary power consumption of the M2M devices, since their mobility is usually pretty low being compared to that of the general-purpose MS's. Thus, it is desirable to provide the M2M devices with a more flexible operation management of the timer-based registration procedure.

BRIEF SUMMARY OF THE INVENTION

The invention proposes to separate the configuration of the registration timer for the general-purpose MS's and the M2M devices, so that the M2M devices may not have to register with the network side too frequently and power consumption of the M2M devices may be saved.

In one aspect of the invention, a mobile communication device configured for M2M communications is provided. The mobile communication device comprises a wireless module and a controller module. The wireless module performs wireless transmissions and receptions to and from a service network. The controller module receives a message with an extension registration period only for the M2M communications from the service network via the wireless module, and periodically performs a registration procedure with the service network via the wireless module according to the extension registration period only for the M2M communications.

In another aspect of the invention, a service network is provided. The service network comprises a radio access network and a core network. The radio access network performs wireless transmissions and receptions to and from a mobile communication device configured for M2M communications. The core network transmits a message with an extension registration period only for the M2M communications to the mobile communication device via the radio access network, such that the mobile communication device periodically performs a registration procedure according to the extension registration period only for the M2M communications.

In yet another aspect of the invention, a method for managing operation of a registration procedure for M2M communications is provided. The operation management method comprises the steps of: providing a mobile communication device configured for the M2M communications with a service network; receiving, by the mobile communication device, a message with an extension registration period only for the M2M communications from the service network; and periodically performing, by the mobile communication device, the registration procedure according to the extension registration period only for the M2M communications.

Other aspects and features of the present invention will become apparent to those with ordinarily skill in the art upon review of the following descriptions of specific embodiments of mobile communication devices, service networks, and methods for managing operation of a registration procedure for M2M communications.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
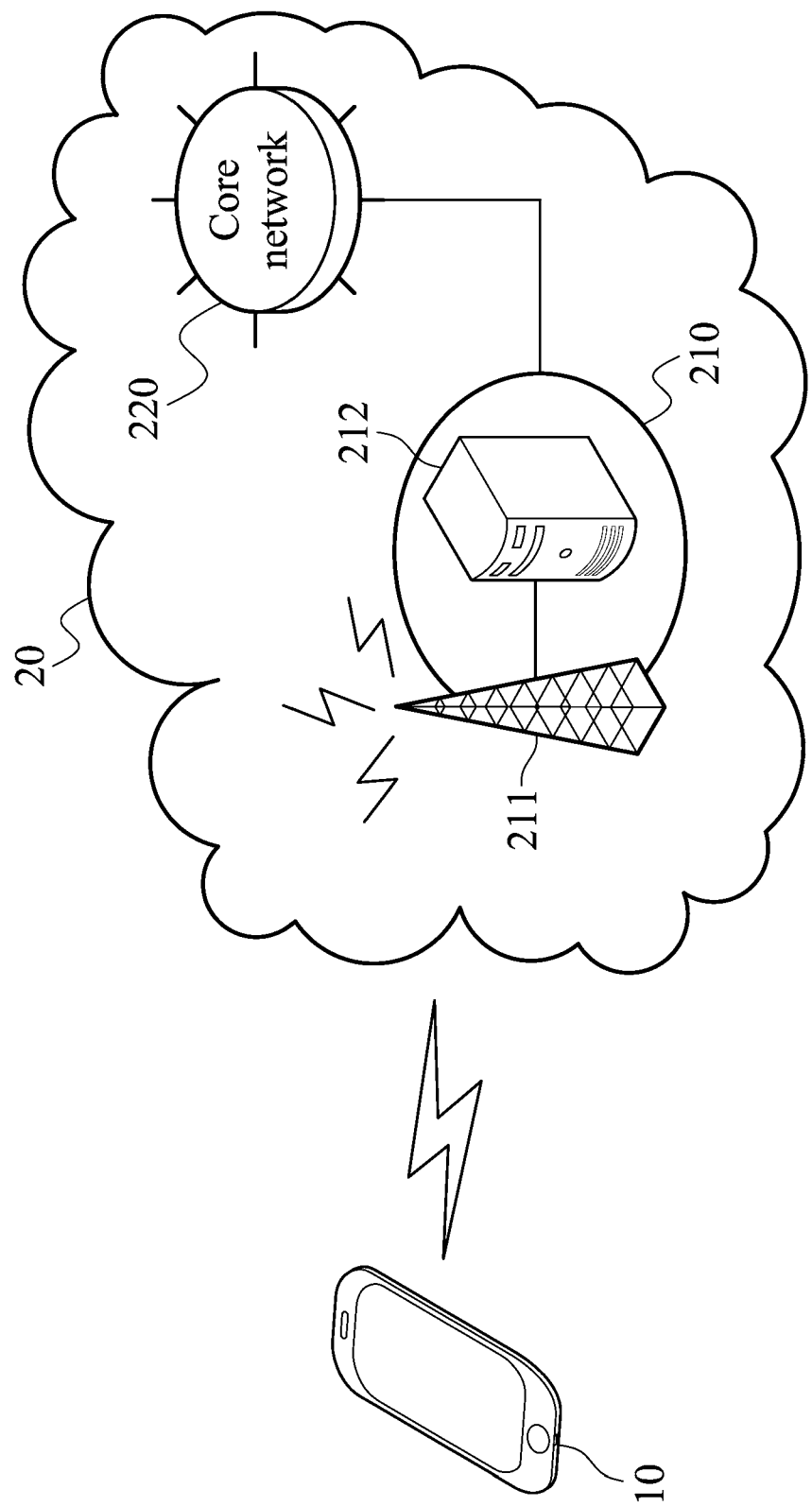
FIG. 1 is a block diagram illustrating a mobile communication environment according to an embodiment of the invention.

FIG. 1 is a block diagram illustrating a mobile communication environment according to an embodiment of the invention. In the mobile communication environment, the mobile communication device 10 is configured for M2M communications with the service network 20 via an air interface. The service network 20 comprises a radio access network 210 and a core network 220, wherein the radio access network 210 is responsible for processing radio signals, terminating radio protocols, and connecting the mobile communication device 10 with the core network 220. The radio access network 210 comprises at least a cellular access station 211 and an access station controller 212. The cellular access station 211 may be a Base Transceiver Station (BTS) or a Base Station (BS), which is controlled by the access station controller 212 and is responsible for providing wireless transceiving functionality for the service network 20. Specifically, the cellular access station 211 generally serves one cell or multiple logical sectors. The access station controller 212 is responsible for controlling the operation of the cellular access station 211, i.e., managing radio resources, radio parameters, and interfaces for the cellular access station 211. The core network 220 is responsible for performing mobility management, network-side authentication, and interfaces with public networks.

In one embodiment, the service network 20 is a CDMA2000 1x system (including 1xRTT, 1xEV-DO Release 0/A/B/C, 1xEV-DO Rev D/E/F). The cellular access station 211 is a Base Transceiver Station (BTS), and the access station controller 212 is a Base Station Controller (BSC). The core network 220 comprises a Circuit-Switched (CS) domain and a Packet-Switched (PS) domain, wherein the CS domain comprises several network entities, such as a Mobile Switching Center emulation (MSCe), Media Gateway (MGW), Media Resource Function Processor (MRFP), Signaling Gateway (SGW), Service Control Point emulation (SCPe), and Home Location Register emulation (HLRe), and the PS domain comprises Packet Data Service Node (PDSN) and Authentication Authorization Accounting (AAA) servers. It is to be understood that, the CDMA2000 1x system is merely an illustrative example, and other wireless communication networks utilizing any future technology of the CDMA2000 1x technology family may be used instead, and the invention is not limited thereto.

Figure 2:
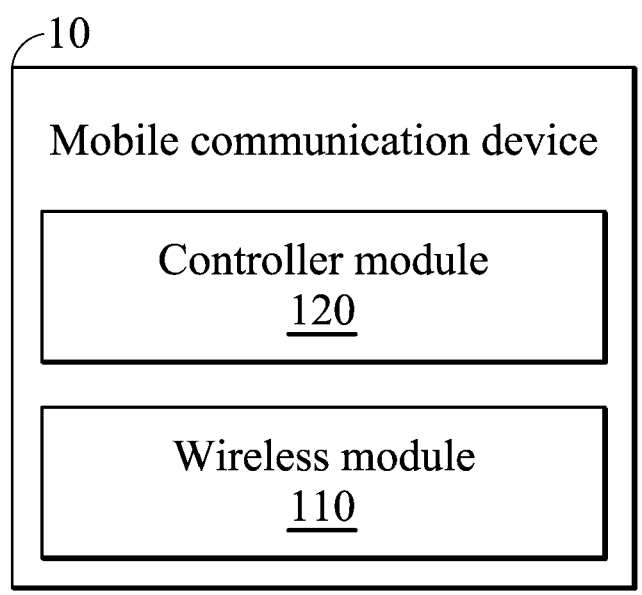
FIG. 2 is a block diagram illustrating the mobile communication device 10 in the embodiment of FIG. 1.

FIG. 2 is a block diagram illustrating the mobile communication device 10 in the embodiment of FIG. 1. The mobile communication device 10 may comprise a wireless module 110 and a controller module 120, wherein the wireless module 110 is configured to perform the functionality of wireless transceiving and the controller module 120 is configured to control the operation of the wireless module 110 for performing the method for managing operation of a registration procedure for M2M communications in the present invention. To further clarify, the wireless module 110 may be a Radio Frequency (RF) unit (not shown), and the controller module 120 may be a general-purpose processor or Micro-Control Unit (MCU) of a baseband unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 800 MHz, 1900 MHz, or 2400 MHz utilized in CDMA2000 1x technology, or others depending on the radio access technology in use. Although not shown, the mobile communication device 10 may further comprise other functional components, such as a display unit and/or keypad serving as the Man-Machine Interface (MMI), a storage unit storing the program codes of applications, or others.

Figure 3:
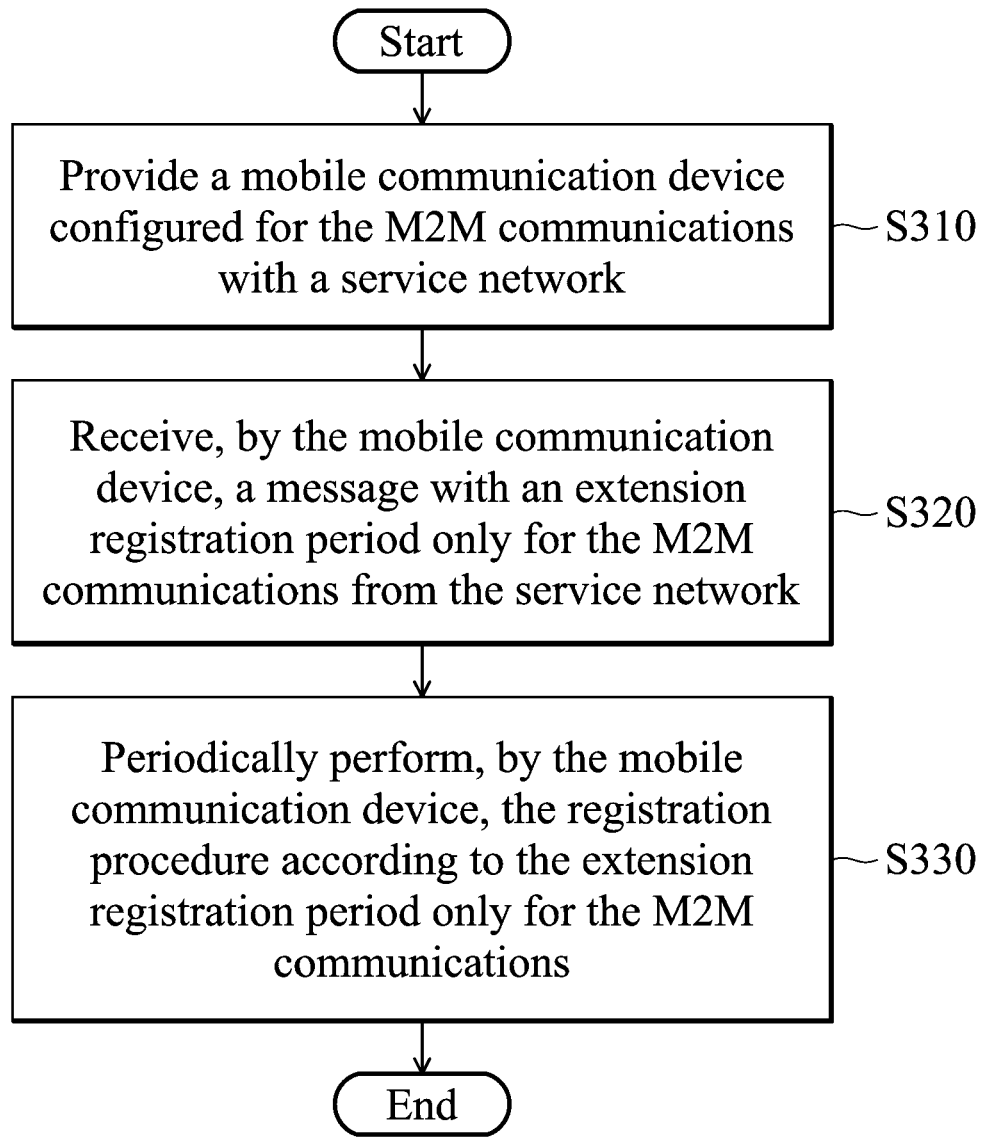
FIG. 3 is a flow chart illustrating the method for managing operation of a registration procedure for M2M communications according to an embodiment of the invention.

FIG. 3 is a flow chart illustrating the method for managing operation of a registration procedure for M2M communications according to an embodiment of the invention. To begin, a mobile communication device configured for M2M communications with a service network is provided (step S310). The mobile communication device configured for M2M communications may be referred to as an M2M device. Next, the mobile communication device receives a message with an extension registration period only for the M2M communications from the service network (S320). Note that, in the invention, the message comprises an independent field for specifying the extension registration period which is dedicated for the M2M communications only. That is, the extension registration period only for the M2M communications is different from the registration period for the general-purpose MS's. After that, the mobile communication device periodically performs a registration procedure according to the extension registration period only for the M2M communications (step S330). To further clarify, the message in step S320 may be a System Parameters Message or a Registration Accepted Order. Detailed descriptions of the message being a System Parameters Message or a Registration Accepted Order are provided below with respective message sequence charts.

Figure 4:
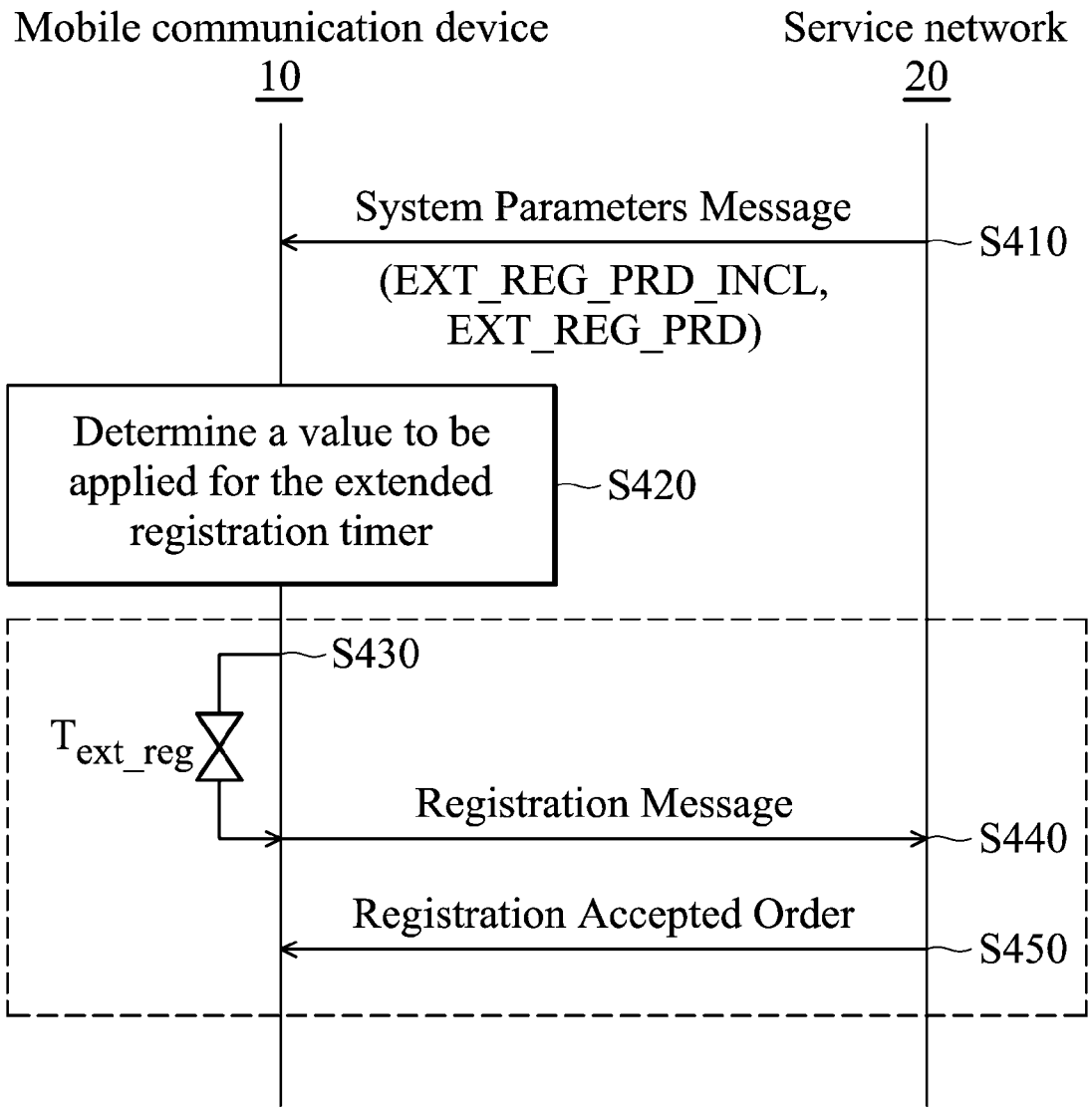
FIG. 4 is a message sequence chart illustrating the registration timer configuration for M2M communications according to an embodiment of the invention.

FIG. 4 is a message sequence chart illustrating the registration timer configuration for M2M communications according to an embodiment of the invention. As shown in FIG. 4, the service network 20 first transmits a System Parameters Message to the mobile communication device 10 (step S410). Specifically, the System Parameters Message comprises a "EXT_REG_PRD_INCL" field and a "EXT_REG_PRD" field, wherein the "EXT_REG_PRD_INCL" field indicates whether the "EXT_REG_PRD" field is included in the System Parameters Message or not, and the "EXT_REG_PRD" field represents an extension registration period only for the M2M communications. If the "EXT_REG_PRD_INCL" field is set to 1, it means that the "EXT_REG_PRD" field is included in the System Parameters Message, and the "EXT_REG_PRD" field indicates a maximum value of the extended registration timer only for the M2M communications. Otherwise, if the "EXT_REG_PRD_INCL" field is set to 0, it means that the "EXT_REG_PRD" field is not included in the System Parameters Message. In one embodiment, the "EXT_REG_PRD_INCL" field may comprise 1 bit for storing the set value (i.e., 0 or 1), and the "EXT_REG_PRD" field may comprise 0 or 2 bits for indicating the maximum value of the extended registration timer only for the M2M communications. For example, the "EXT_REG_PRD" field may comprise 2 bits if the "EXT_REG_PRD_INCL" field is set to 1, and the 2 bits of the "EXT_REG_ PRD" field may constitute 4 different values.

Subsequently, due to the "EXT_REG_PRD_INCL" field being set to 1 in this embodiment, the mobile communication device 10 reads the extension registration period only for the M2M communications indicated by the "EXT_REG_PRD"

field, and then periodically performs a registration procedure with the service network 20 according to the extension registration period only for the M2M communications. Specifically, the mobile communication device determines a value to be applied for the extended registration timer (step S420). Firstly, a maximum value of the extended registration timer only for the M2M communications is determined by the following equation.

$$\lfloor 2^{EXT\_REG\_PRD} \rfloor \times 14 \times 3600 \text{ sec}$$

Secondly, the value to be applied for the extended registration timer is determined, which is a power of two and between $\lfloor 2^{REG\_PRD/4} \rfloor$ and $\lfloor 2^{EXT\_REG\_PRD} \rfloor \times 14 \times 3600/0.08$, wherein "REG_PRD" represents the value of the registration timer for non-M2M communications used by the general-purpose MS's, and "REG_PRD" is also included in the System Parameters Message.

After determining the value to be applied for the extended registration timer, the mobile communication device 10 starts the extended registration timer (denoted as $T_{ext\_reg}$ in FIG. 4) (S430). Later, when the extended registration timer expires, the mobile communication device 10 registers with the service network 20 by transmitting a Registration Message to the service network 20 (step S440), and receiving a Registration Accepted Order from the service network 20 (step S450). Note that, the extended registration timer is used to trigger the performing of the registration procedure each time when it expires and is reset in response to each successful registration procedure. Thus, as denoted by the dotted block, steps S430 to S450 may be repeated.

Figure 5:
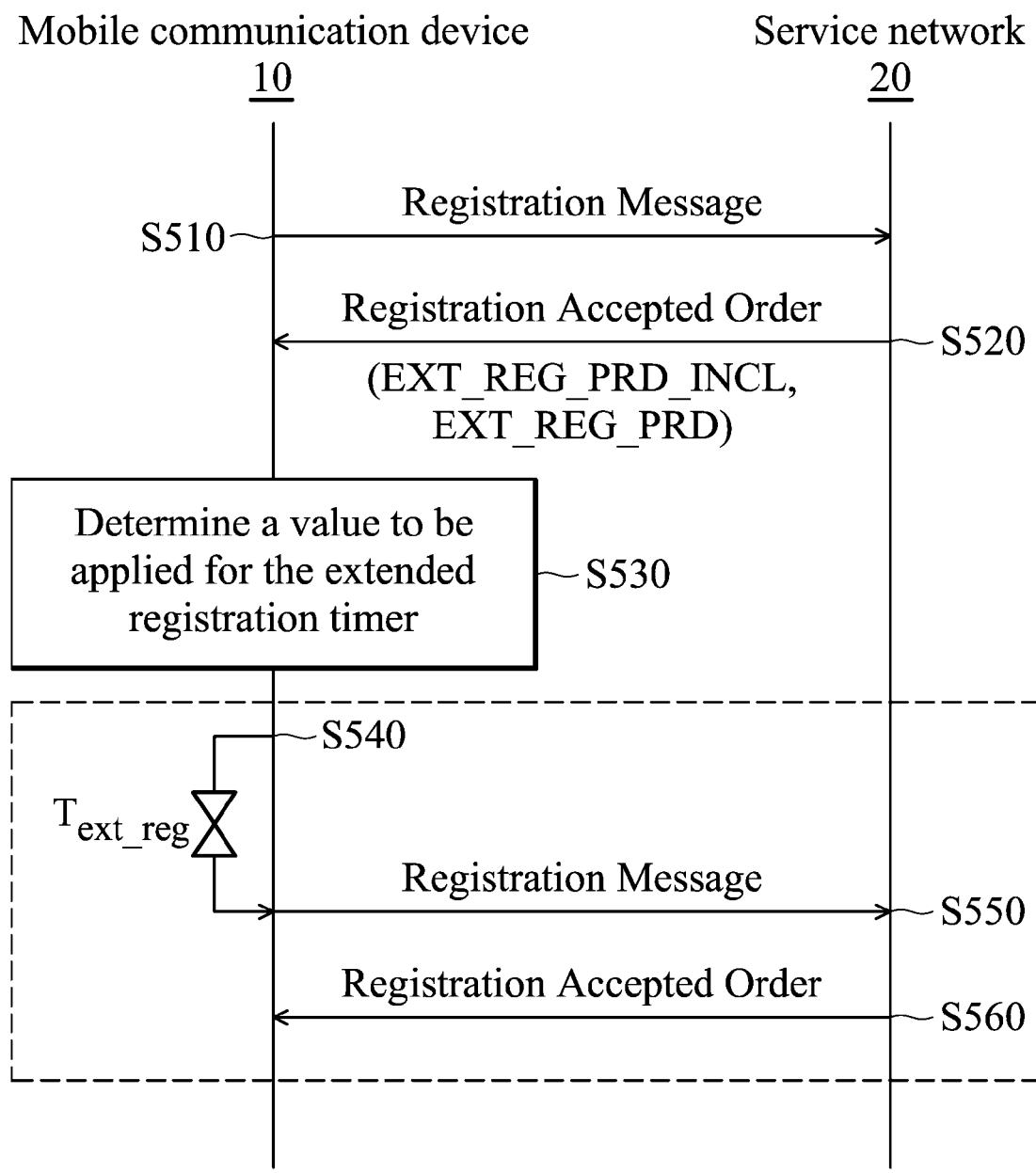
FIG. 5 is a message sequence chart illustrating the registration timer configuration for M2M communications according to another embodiment of the invention.

FIG. 5 is a message sequence chart illustrating the registration timer configuration for M2M communications according to another embodiment of the invention. As shown in FIG. 5, the mobile communication device 10 first initiates a registration procedure by transmitting a Registration Message to the service network 20 (step S510). Regarding the detailed description of the Registration Message, reference may be made to the 3GPP2 specification(s) of the 1xEV-DO Rev F technology. When receiving the Registration Message, the service network 20 replies with a Registration Accepted Order to the mobile communication device 10 (step S520). Specifically, the Registration Accepted Order comprises a "EXT_REG_PRD_INCL" field and a "EXT_REG_PRD" field, wherein the "EXT_REG_PRD_INCL" field indicates whether the "EXT_REG_PRD" field is included in the Registration Accepted Order or not, and the "EXT_REG_PRD" field represents an extension registration period only for the M2M communications. If the "EXT_REG_PRD_INCL" field is set to 1, it means that the "EXT_REG_PRD" field is included in the Registration Accepted Order, and the "EXT_REG_PRD" field indicates a maximum value of the extended registration timer only for the M2M communications. Otherwise, if the "EXT_REG_PRD_INCL" field is set to 0, it means that the "EXT_REG_PRD" field is not included in the Registration Accepted Order. In one embodiment, the "EXT_REG_PRD_INCL" field may comprise 1 bit for storing the set value (i.e., 0 or 1), and the "EXT_REG_PRD" field may comprise 0 or 7 bits for indicating the maximum value of the extended registration timer only for the M2M communications. For example, the "EXT_REG_PRD" field may comprise 7 bits if the "EXT_REG_PRD_INCL" field is set to 1, and the 7 bits of the "EXT_REG_PRD" field may constitute 128 different values.

Subsequently, due to the "EXT_REG_PRD_INCL" field being set to 1 in this embodiment, the mobile communication device 10 reads the extension registration period only for the M2M communications indicated by the "EXT_REG_PRD" field, and then periodically performs the registration procedure with the service network 20 according to the extension registration period only for the M2M communications. Specifically, the mobile communication device 10 determines a value to be applied for the extended registration timer (step S530), and then starts the extended registration timer (denoted as $T_{ext\_reg}$ in FIG. 5) (S540). The description of the determination of the value for the extended registration timer is similar to that for the embodiment of FIG. 4, and is not repeated here for brevity. Later, when the extended registration timer expires, the mobile communication device 10 registers with the service network 20 by transmitting a Registration Message to the service network 20 (step S550), and receiving a Registration Accepted Order from the service network 20 (step S560). As denoted by the dotted block, steps S540 to S560 may be repeated for periodical registration. Note that, the "EXT_REG_PRD_INCL" field and the "EXT_REG_PRD" field may be included in the Registration Accepted Order only for the initial registration (i.e., steps S510 to S530), and may not be included for subsequent registrations (i.e., steps S550 to S560).

It is to be understood that, in the embodiment of FIG. 5, the service network 20 may configure the M2M devices respectively as desired, since the registration timer configuration is accomplished by the registration procedure which is dedicatedly performed for each M2M device. In addition, for the mobile communication device 10, the extension registration period only for the M2M communications may be used until a new value is updated by another Registration Accepted Order from the service network 20.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communication device, configured for Machine-to-Machine (M2M) communications, comprising:
    a Radio Frequency (RF) device performing wireless transmissions and receptions to and from a service network; and
    a baseband processor receiving a System Parameters Message of a Code Division Multiple Access 2000 (CDMA 2000) technology, wherein the System Parameters Message comprises an extension registration period only for the M2M communications from the service network via a wireless module, and periodically performing a registration procedure with the service network via the wireless module according to the extension registration period only for the M2M communications.

2. The mobile communication device of claim 1, wherein the extension registration period only for the M2M communications indicates a maximum value of an extended registration timer which triggers the performing of the registration procedure each time when it expires and is reset in response to each successful registration procedure.

3. A service network, comprising:
    a radio access network performing wireless transmissions and receptions to and from a mobile communication device configured for Machine-to-Machine (M2M) communications; and
    a core network transmitting a System Parameters Message of a Code Division Multiple Access 2000 (CDMA 2000) technology, wherein the System Parameters Message comprises an extension registration period only for the M2M communications to the mobile communication device via the radio access network, such that the mobile communication device periodically performs a registration procedure according to the extension registration period only for the M2M communications.

4. The service network of claim 3, wherein the extension registration period only for the M2M communications indicates a maximum value of an extended registration timer which triggers the mobile communication device to perform the registration procedure each time when it expires and is reset in response to each successful registration procedure.

5. A method for managing operation of a registration procedure for M2M communications, comprising:
provide a mobile communication device configured for the M2M communications with a service network;
receiving, by the mobile communication device, a System Parameters Message of a Code Division Multiple Access 2000 (CDMA 2000) technology, wherein the System Parameters Message comprises an extension registration period only for the M2M communications from the service network; and
periodically performing, by the mobile communication device, the registration procedure according to the extension registration period only for the M2M communications.

6. The method of claim 5, wherein the extension registration period only for the M2M communications indicates a maximum value of an extended registration timer which triggers the mobile communication device to perform the registration procedure each time when it expires and is reset in response to each successful registration procedure.

* * * * *